(12) United States Patent
Byun et al.

(10) Patent No.: US 7,414,696 B2
(45) Date of Patent: Aug. 19, 2008

(54) FABRICATION SYSTEM FOR LIQUID CRYSTAL DISPLAY DEVICE AND METHOD OF FABRICATING LIQUID CRYSTAL DISPLAY DEVICE USING THE SAME

(75) Inventors: Young-Sang Byun, Gyoungsangbuk-Do (KR); Kyung-Su Chae, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/607,007

(22) Filed: Jun. 27, 2003

(65) Prior Publication Data

US 2005/0024579 A1 Feb. 3, 2005

(30) Foreign Application Priority Data

Aug. 22, 2002 (KR) .................. 10-2002-0049850

(51) Int. Cl.
G02F 1/13 (2006.01)
G02F 1/1341 (2006.01)
G02F 1/1339 (2006.01)

(52) U.S. Cl. .................. 349/187; 349/189; 349/190

(58) Field of Classification Search ......... 349/153–154, 349/187–190
See application file for complete search history.

(56) References Cited

U.S. PATENT DOCUMENTS

| | | | |
|---|---|---|---|
| 4,094,058 A | 6/1978 | Yasutake et al. | |
| 6,011,609 A | 1/2000 | Kato et al. | |
| 6,222,603 B1 | 4/2001 | Sakai et al. | |
| 6,646,689 B2 * | 11/2003 | Matsuda | 349/1 |
| 6,710,843 B2 * | 3/2004 | Choo et al. | 349/187 |
| 2001/0002858 A1 | 6/2001 | Kageyama et al. | |
| 2002/0008838 A1 | 1/2002 | Matsuda | |
| 2002/0062787 A1 | 5/2002 | Hashizume et al. | |
| 2002/0191145 A1 | 12/2002 | Choo et al. | |
| 2003/0160907 A1 | 8/2003 | Kweon et al. | |
| 2004/0012755 A1 | 1/2004 | Choo et al. | |

FOREIGN PATENT DOCUMENTS

| | | |
|---|---|---|
| EP | 0740184 | 10/1996 |
| JP | 05034652 A | 2/1993 |
| JP | 06194659 A | 7/1994 |

(Continued)

*Primary Examiner*—Dung T. Nguyen
(74) *Attorney, Agent, or Firm*—McKenna Long & Aldridge LLP

(57) ABSTRACT

A fabrication system for a liquid crystal display device includes an alignment layer line for forming an alignment layer on a first substrate and a second substrate, the first substrate and the second substrate being separately supplied thereto, a spacer scattering line for scattering spacers on one of the first substrate and the second substrate, a sealant coating line for coating a sealant material on one of the first substrate and the second substrate, an assembling line for bonding the first and second substrates together, a cutting line for separating the bonded first and second substrates into a plurality of liquid crystal display cells, and a liquid crystal layer line for injecting liquid crystal material into each of the liquid crystal display cells, wherein the alignment layer line, the spacer scattering line, the sealant coating line, the assembling line, the cutting line, and the liquid crystal line are positioned along a single fabrication line.

8 Claims, 9 Drawing Sheets

FOREIGN PATENT DOCUMENTS

| | | |
|---|---|---|
| JP | 06208096 A | 7/1994 |
| JP | 08-171076 | 7/1996 |
| JP | 10-068949 | 3/1998 |
| JP | 10-096912 | 4/1998 |
| JP | 2001-221987 | 8/2001 |
| JP | 2001-356313 A | 12/2001 |
| JP | 2001356313 | 12/2001 |
| JP | 2002-229044 | 8/2002 |
| JP | 2003075795 | 3/2003 |
| KR | 10-2002-003836 A | 1/2002 |
| KR | 2002089782 | 11/2002 |
| KR | 2003006715 | 1/2003 |

\* cited by examiner

FABRICATION SYSTEM FOR LIQUID CRYSTAL DISPLAY DEVICE AND METHOD OF FABRICATING LIQUID CRYSTAL DISPLAY DEVICE USING THE SAME

The present invention claims the benefit of Korean Patent Application No. 49850/2002 filed in Korea on Aug. 22, 2002, which is hereby incorporated by reference.

BACKGROUND OF THE INVENTION

1. Field of the Invention

The present invention relates to a fabrication system of a display device and a method of fabricating a device using a fabrication system, and more particularly, to a fabrication system of a liquid crystal display (LCD) device and a method of fabricating a liquid crystal display device using the fabrication system.

2. Description of the Related Art

LCD devices are commonly implemented in various types of electronic equipment, such as mobile telephones, personal digital assistants (PDA), and notebook computers, due to their light weight, slim shape, and high image definition. Among the different types of LCD devices, active matrix TFT (thin film transistor) LCD devices have rapid response times and produce lower amounts of residual images.

FIG. 1 is a schematic circuit diagram of an LCD device according to the related art. In FIG. 1, a liquid crystal display panel 1 includes a plurality of gate lines 3 disposed along a first direction and a plurality of data lines 5 disposed along a second direction perpendicular to the first direction, thereby defining a plurality of pixel regions. In addition, a thin film transistor (TFT) 7 is arranged within each of the pixel regions and is enabled when a scan signal is input through the gate line 3 in order to supply a data signal input through the data line 5 to a liquid crystal layer 9. Moreover, a storage capacitor 11 is provided for maintaining the input data signal until a next scan signal is supplied.

FIG. 2 is a cross sectional view of an LCD device according to the related art. In FIG. 2, a gate electrode 22 is formed on a lower substrate 20, and a gate insulating layer 24 is deposited on an entire surface of the lower substrate 20. In addition, a semiconductor layer 26 is formed on the gate insulating layer 24, and source/drain electrodes 28 are formed on the semiconductor layer 26. Furthermore, a passivation layer 32 is deposited over an entire surface of the lower substrate 20, and a pixel electrode 30 made of transparent metal, such as ITO (indium tin oxide), is formed in a display region and is electrically connected to the source/drain electrodes 28 through a contact hole in the passivation layer 32.

A black matrix 42, which functions as a light shielding layer, is formed in a non-display region of an upper substrate 40 in order to prevent reduction of image quality, and a color filter layer 44 is formed in the display region. In addition, a common electrode 46 made of transparent metal, such as ITO, is formed on the black matrix 42 and the color filter layer 44. A spacer 52 is provided between the lower substrate 20 and the upper substrate 40 to maintain a uniform cell gap. In addition, a liquid crystal material is injected between the lower and upper substrates 20 and 40 to form a liquid crystal material layer 50. Although not shown, alignment layers for aligning liquid crystal molecules of the liquid crystal material layer 50 are deposited on the pixel electrode 30 of the lower substrate 20 and on the common electrode 46 of the upper substrate 40.

In FIG. 2, the semiconductor layer 26 is activated to form a channel layer when the scan signal input through the gate line 3, wherein the data signal input from the data line 5 is supplied to the liquid crystal material layer 50 through the channel layer. Each of the gate electrodes 22 of the TFTs are connected to at least one of the gate lines 3, which are arranged along the first direction. Accordingly, by supplying the scan signal to the gate line 3, the semiconductor layer connected to the corresponding gate line 3 is activated, so that the data signal is supplied to the liquid crystal material layer 50 of the pixel through the data line 5 to control the liquid crystal molecules of the corresponding pixel.

FIG. 3 is a flow chart of a fabrication method of an LCD device according to the related art. In FIG. 3, a fabrication method of an LCD device includes a TFT array process for forming thin film transistors (7 in FIG. 1) on the lower substrate 20, a color filter process for forming a color filter 44 (in FIG. 1) on the upper substrate 40, and a cell production process.

A step S101 includes the TFT array process, wherein the gate lines 3 and the data lines 5 are formed on the lower substrate 20, and the TFTs 7 connected to the gate lines 3 and the data lines 5 are formed at each pixel region. Furthermore, the pixel electrode 30 connected to the TFTs 7 are formed to control the liquid crystal material layer 50 when the signal is supplied through the TFTs 7.

A step S104 includes the color filter process, wherein the color filter layer 44 and the common electrode 46 are formed on the upper substrate 40.

Steps S102 and S105 include forming alignment layers on the lower substrate 20 and the upper substrate 40, and rubbing the alignment layers to provide aligning controlling forces or surface fixing forces (i.e., pretilt angles and alignment directions) to the liquid crystal molecules of the liquid crystal layer 50 between the lower and upper substrates 20 and 40.

A step S103 includes scattering spacers 52 on the lower substrate 20 to maintain a uniform cell gap.

A step S106 includes coating a sealant material along an edge area of the upper substrate 40.

A step S107 includes assembling the lower and upper substrates 20 and 40 by bonding the lower and upper substrates 20 and 40 together by applying pressure.

A step S108 includes a cell production process, wherein the bonded lower and upper substrates 20 and 40 are cut to produce a plurality of individual liquid crystal display cells.

A step S109 includes injecting the liquid crystal material into each of the individual liquid crystal display cells through a liquid crystal injection hole formed in the sealant material. In addition, an encapsulation process includes sealing the liquid crystal injection hole.

A step S110 includes inspecting the individual liquid crystal display cells.

As described above, the LCD device is fabricated through the TFT array process, the color filter process, and the cell production process. However, each of the processes are performed using different fabrication systems. For example, the TFT substrate is fabricated using a TFT array fabrication system (i.e., a TFT line), the C/F substrate is fabricated using a color filter fabrication system (i.e., a C/F line), and the TFT substrate and the C/F substrate are attached and processed using a cell fabrication system (i.e., a cell line) to fabricate the individual liquid crystal display cells. In addition, the TFT line, the C/F line, and the cell line each include a plurality of individual process lines, respectively.

FIGS. 4A-4D are schematic flow charts showing a system for fabricating an LCD device according to the related art. FIGS. 4A and 4B show a TFT line and a C/F line, respectively, and FIGS. 4C and 4D show a cell line. In FIG. 4A, the lower substrate 20 upon which the TFTs 7 are formed passes an alignment layer line, a rubbing line, and a spacer scattering line of the TFT line. In the alignment layer line, the lower substrate 20 is cleaned, an alignment layer material is deposited, and the deposited alignment layer material is heated at a high temperature to plasticize the alignment layer material. In the rubbing line, the alignment layer of the lower substrate 20 is rubbed to provide the aligning controlling force. In the spacer scattering line, the spacers, such as ball spacers, are scattered on the lower substrate 20 after the lower substrate 20 is cleaned. Then, the lower substrate 20 is provided to a first transferring device.

In FIG. 4B, the upper substrate 40 upon which the color filter layer 42 is formed passes an alignment layer line, a rubbing line, and a spacer scattering line. In the alignment layer line, the upper substrate 40 is cleaned, an alignment layer material is deposited, and the deposited alignment layer material is heated at a high temperature to plasticize the alignment layer material. In the rubbing line, the alignment layer of the upper substrate 40 is rubbed to provide the aligning controlling force. In the spacer scattering line, the spacers, such as ball spacers, are scattered on the lower substrate 40 after the lower substrate 40 is cleaned. Then, the upper substrate 40 is provided to a second transferring device.

In FIGS. 4A and 4B, the alignment layer line and the rubbing line, the rubbing line and the spacer scattering line, the rubbing line and the sealant coating line are not continuous fabrication lines, respectively. Although not shown, a transferring means, such as a robot (i.e., loader or unloader), is installed between each of the alignment layer line, the rubbing line, and the spacer scattering line.

The alignment layer line and the spacer scattering line, as shown in FIG. 4A, are performed on the TFT line. Furthermore, the alignment layer line and the sealant coating line, as shown in FIG. 4B, are performed on the C/F line. For example, during the TFT process, the alignment layer process and the spacer scattering process are performed on the lower substrate 20, and during the C/F process, the alignment layer/rubbing process and the sealant coating process are performed on the upper substrate 40. These processes are separately performed on the lower and upper substrates 20 and 40.

In FIG. 4C, the lower substrate 20 (i.e., TFT substrate) passes through the TFT line and is transferred to an assembling line using a first transferring device. Similarly, the upper substrate 40 (i.e., C/F substrate) passes through the C/F line and is transferred to an assembling line using a second transferring device. In the assembling line, the TFT substrate and the C/F substrate are aligned and bonded together by pressure, the bonded substrates are heated to harden the sealant material. Then, the bonded substrates are cut into separate liquid crystal cells in the cutting line.

In FIG. 4D, the separated liquid crystal display cells are transferred to a grinding line using a third transferring device, wherein each of the liquid crystal display cells undergo grinding and cleaning processes. Next, the liquid crystal display cells are input to a liquid crystal injection line to inject the liquid crystal material through the liquid crystal injection hole and to encapsulate the liquid crystal injecting hole with the encapsulation material. Then, the encapsulated liquid crystal display cells are input to an inspection line to clean in the liquid crystal display cells and inspect the liquid crystal display cells.

Accordingly, the alignment layers are formed on the lower and upper substrates 20 and 40 along the TFT line and the C/F line, respectively, the bonded lower and upper substrates 20 and 40 proceeds through the assembling and cutting lines, the liquid crystal material is injected into the liquid crystal display cells, the inspection of the liquid crystal panel is performed, and LCD device is fabricated.

The alignment layer and spacer scattering lines, as shown in FIG. 4A, and the alignment layer and sealant coating lines, as shown in FIG. 4B, may be arranged in a fabrication facility along parallel directions and spaced apart from each other. In addition, the assembling and cutting lines, as shown in FIG. 4C, and the grinding and liquid crystal injecting lines, as shown in FIG. 4D, are arranged to be separated from the alignment layer and spacer scattering lines, as shown in FIG. 4A, and the alignment layer and sealant coating lines, as shown in FIG. 4B. Accordingly, the TFT substrate output from the alignment layer and spacer scattering lines is mounted on a first transferring device to be transferred to the assembling and cutting line, and input to the assembling and cutting lines by a loading device, such as a robot. Similaryl, the C/F substrate output from the alignment layer and sealant coating lines is mounted on a second transferring device to be transferred to the assembling and cutting line, and input to the assembling and cutting lines by another loading device, such as another robot. In addition, the liquid crystal display cells in the assembling and cutting lines are individually mounted on a third transferring device to be transferred to the liquid crystal injecting line. The first, second, and third transferring devices move automatically between the process lines to transfer the substrates into each of the lines, wherein a plurality of substrates (or display cells) are fixed by a cassette mounted on the transferring device.

Accordingly, large amounts of open spaces are required since the process lines shown in FIGS. 4A-4D are arranged separately in a fabrication facility, thereby increasing fabrication costs of the LCD device. In addition, automated transfer devices are required to proceed between each process along one process line, thereby further increasing the fabrication costs of the LCD device. Furthermore, since the automated transfer devices are very expensive, the fabrication costs of the LCD device are further increased. Moreover, the processes can be delayed due to the time required to transfer each of the substrates.

SUMMARY OF THE INVENTION

Accordingly, the present invention is directed to a fabrication system for a liquid crystal display device and method of fabricating a liquid crystal display device using a fabrication system that substantially obviates one or more of the problems due to limitations and disadvantages of the related art.

An object of the present invention to provide a fabrication system for a liquid crystal display device for reducing production costs.

Another object of the present invention to provide a method of fabricating a liquid crystal display device using a fabrication system for reducing production costs.

Another object of the present invention to provide a fabrication system for a liquid crystal display device for reducing fabrication time.

Another object of the present invention to provide a method of fabricating a liquid crystal display device using a fabrication system for reducing fabrication time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fabrication system for a liquid crystal display device includes an alignment layer line for forming an alignment layer on a first substrate and a second substrate, the first substrate and the second substrate being separately supplied thereto, a spacer scattering line for scattering spacers on one of the first substrate and the second substrate, a sealant coating line for coating a sealant material on one of the first substrate and the second substrate, an assembling line for bonding the first and second substrates together, a cutting line for separating the bonded first and second substrates into a plurality of liquid crystal display cells, and a liquid crystal layer line for injecting liquid crystal material into each of the liquid crystal display cells, wherein the alignment layer line, the spacer scattering line, the sealant coating line, the assembling line, the cutting line, and the liquid crystal line are positioned along a single fabrication line, In another aspect, a fabrication system for a liquid crystal display device includes a first fabrication line separately supplied with a first substrate and a second substrate to form an alignment layer on the first substrate and the second substrate, scatter spacers on the first substrate, coat a sealant material on the second substrate, bond the first and second substrates together, and cut the bonded first and second substrates into a plurality of liquid crystal display cells, and a second fabrication line for injecting liquid crystal material into each of the liquid crystal display cells to form a liquid crystal material layer and for inspecting the liquid crystal display cells.

In another aspect, a fabrication system for a liquid crystal display device includes an alignment layer line for forming an alignment layer on a first substrate and a second substrate, the first substrate and second substrate being separately supplied to the alignment layer line, a liquid crystal layer line for dispensing liquid crystal material on one of the first substrate and the second substrate, a sealant coating line for coating a sealant material on one of the first substrate and the second substrate, an assembling line for bonding the first and second substrates together, and a cutting line for separating the bonded first and second substrates into a plurality of liquid crystal display cells, wherein the alignment layer line, the liquid crystal layer line, the sealant coating line, the assembling line, and the cutting line are positioned along a single fabrication line.

In another aspect, method of fabricating a liquid crystal display device includes providing a first substrate and a second substrates separately to a unified fabrication line, forming an alignment layer on the first substrate and the second substrate, scattering spacers on one of the first substrate and the second substrate, coating a sealant material on one of the first substrate and the second substrate, bonding the first and second substrates together, separating the bonded first and second substrates into a plurality of liquid crystal display cells, and forming a liquid crystal material layer within each of the liquid crystal display cells.

In another aspect, a method of fabricating a liquid crystal display device includes supplying a first substrate and a second substrate to an in-line fabrication system to form an alignment layer on the first substrate, form spacers on the first substrate, coat a sealant material on the second substrate, bond the first and second substrates together, and separate the bonded first and second substrates into a plurality of liquid crystal display cells, injecting liquid crystal material into each of the liquid crystal display cells to form a liquid crystal material layer, and inspecting the liquid crystal display cells.

In another aspect, a method of fabricating a liquid crystal display device includes supplying a first substrate and a second substrate separately into a single fabrication system, forming an alignment layer on the first and second substrates separately, dispensing liquid crystal material onto one of the first substrate and the second substrate, coating a sealant material on one of the first substrate and the second substrate, bonding the first and second substrates together, and separating the bonded first and second substrates into a plurality of liquid crystal display cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made it detail to the preferred embodiments of the present invention, examples of which are illustrated in the accompanying drawings.

Figure 1:
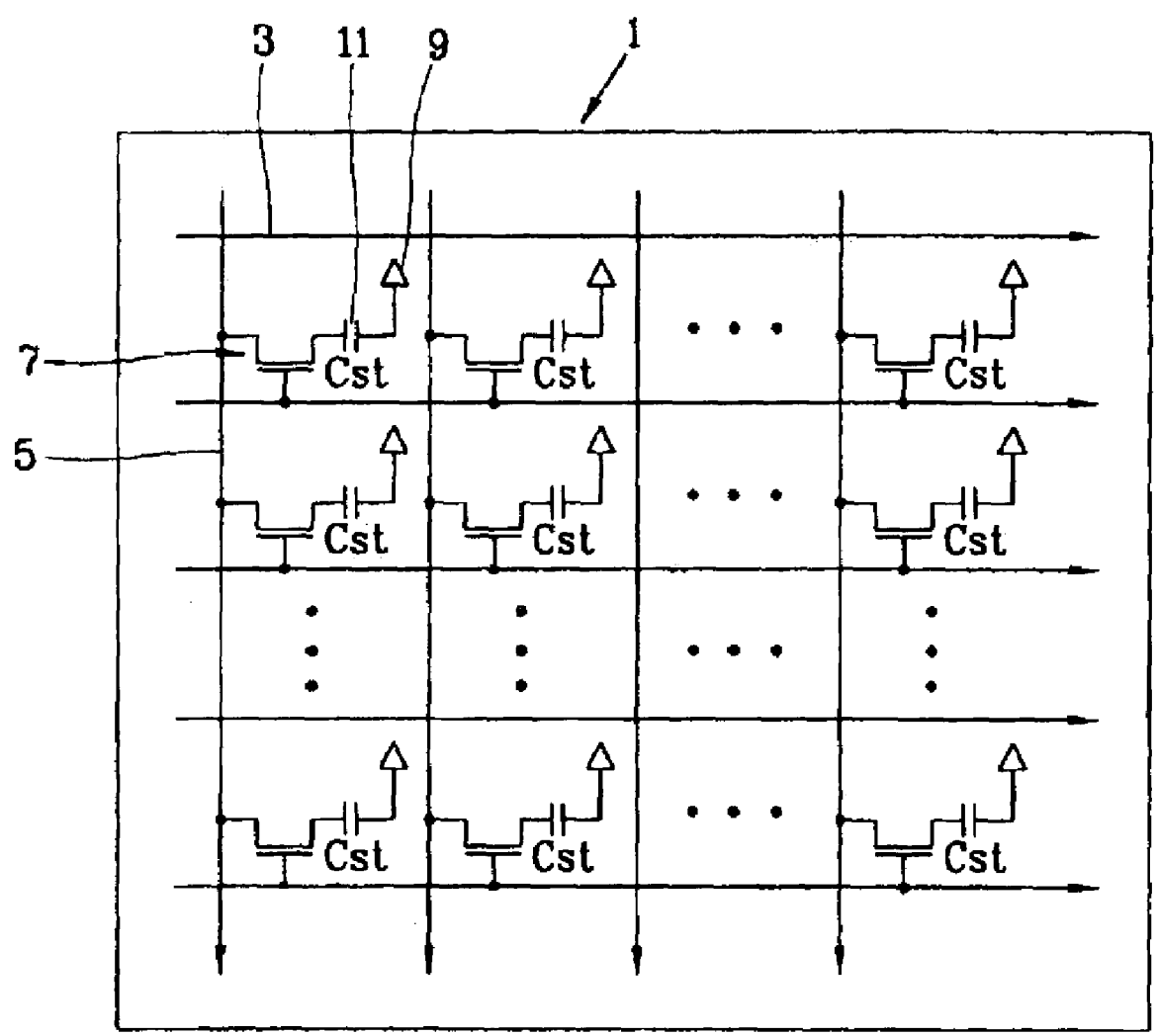
FIG. 1 is a schematic circuit diagram of an LCD device according to the related art.
Figure 2:
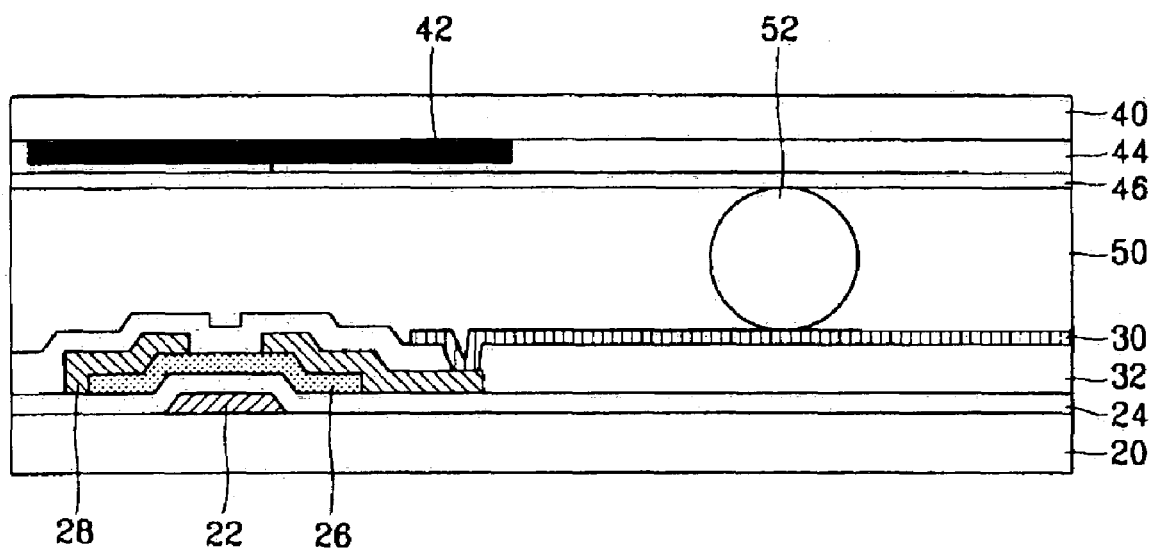
FIG. 2 is a cross sectional view of an LCD device according to the related art.
Figure 3:
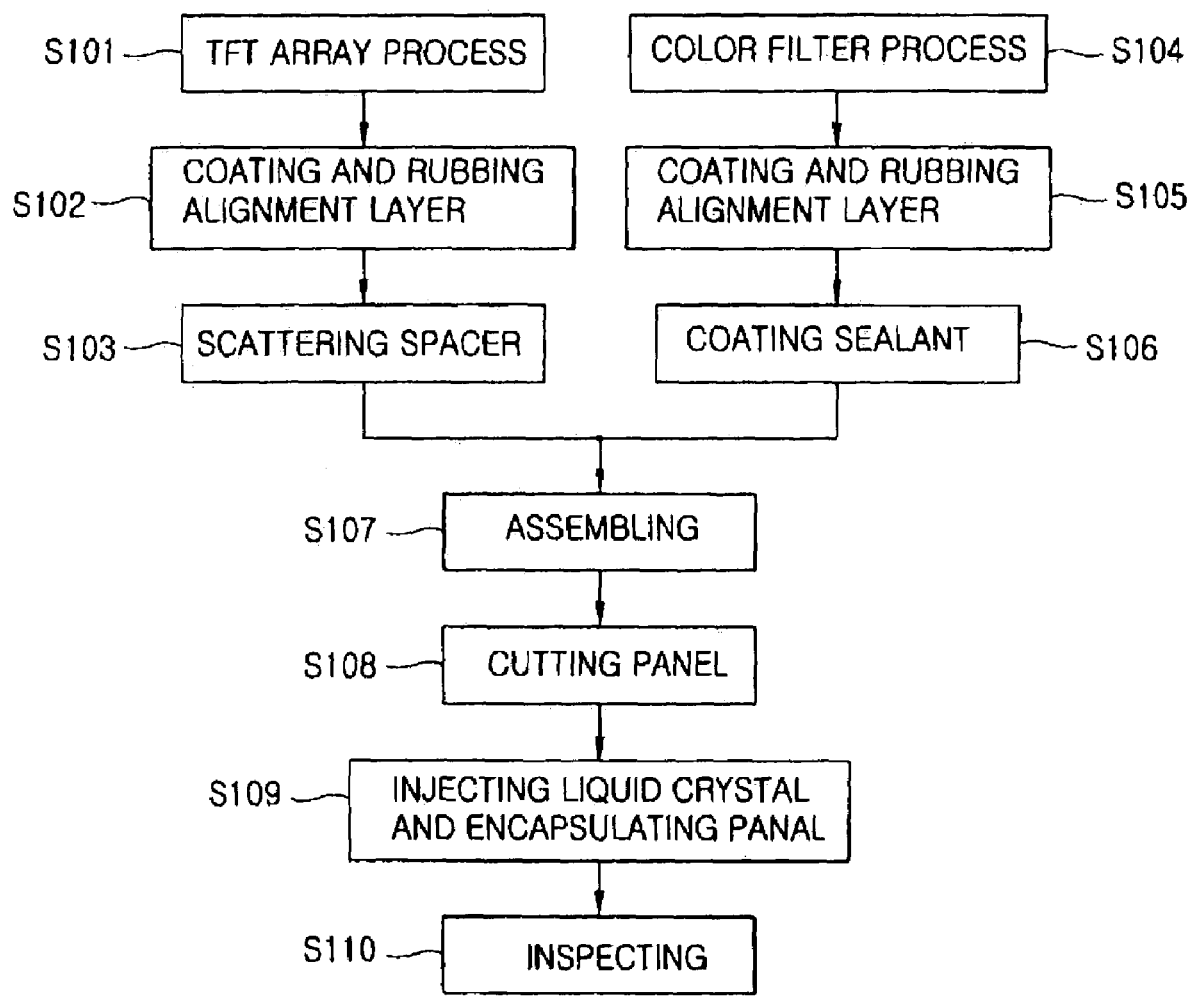
FIG. 3 is a flow chart of fabrication method of an LCD device according to the related art.
Figure 4A:
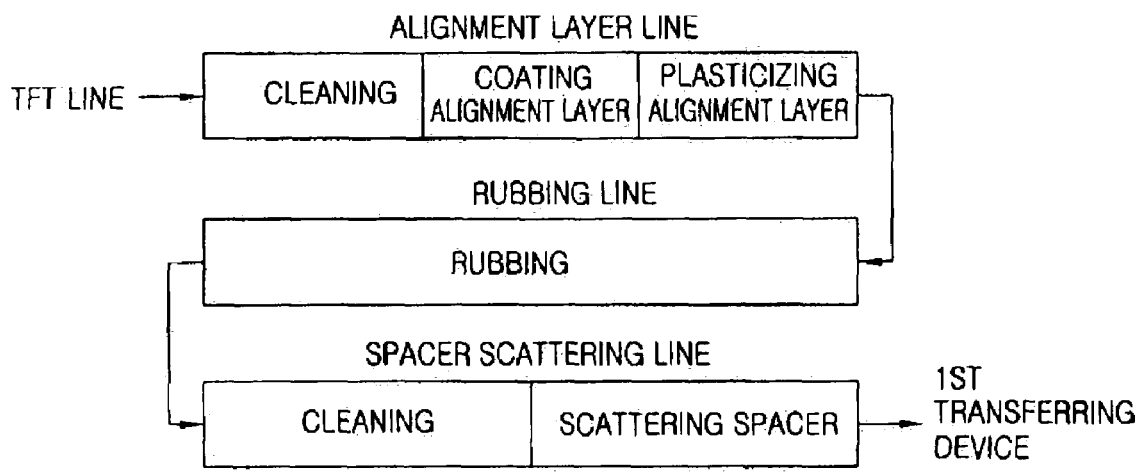
FIGS. 4A-4D are schematic flow charts showing a system for fabricating an LCD device according to the related art.
Figure 4B:
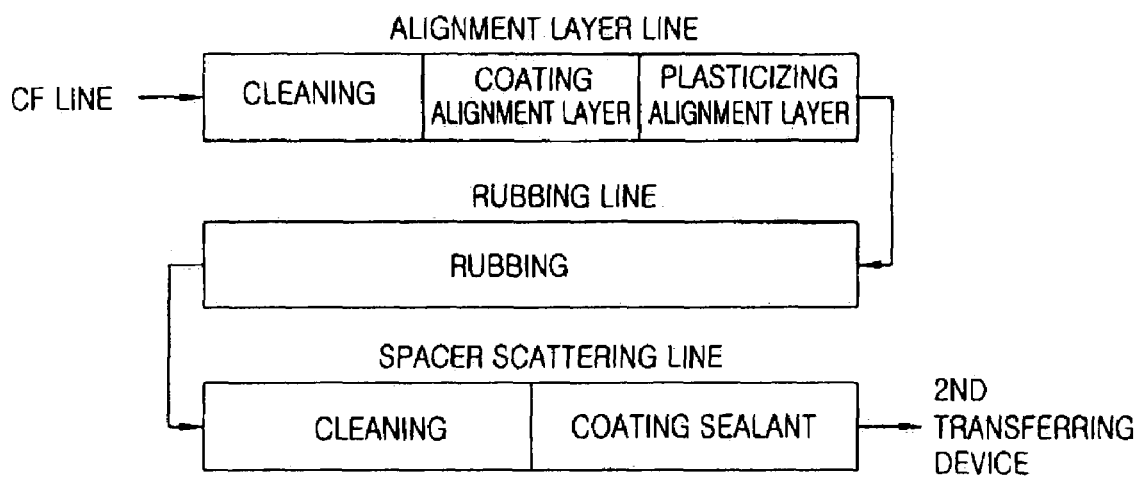
Figure 4C:
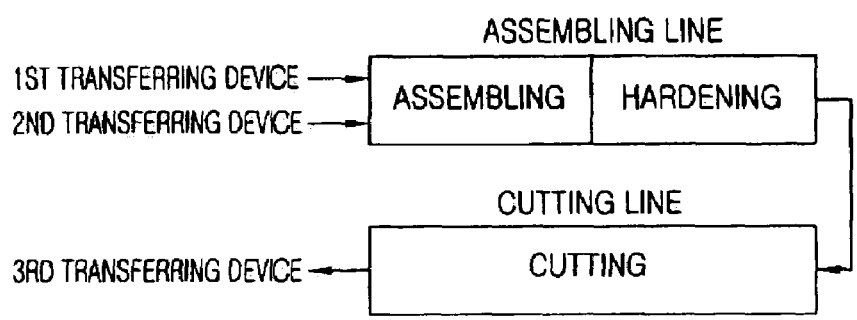
Figure 4D:
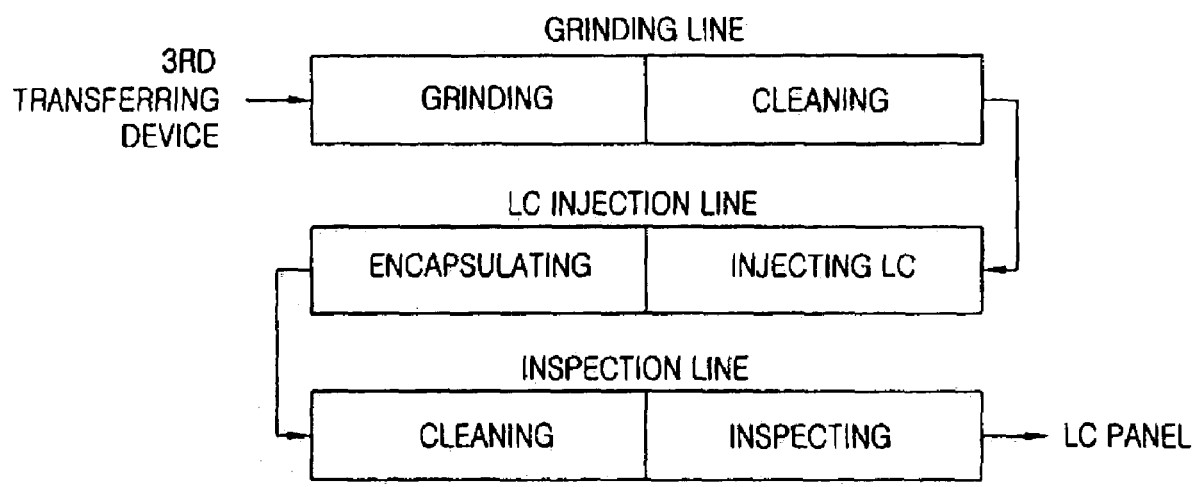
Figure 5:
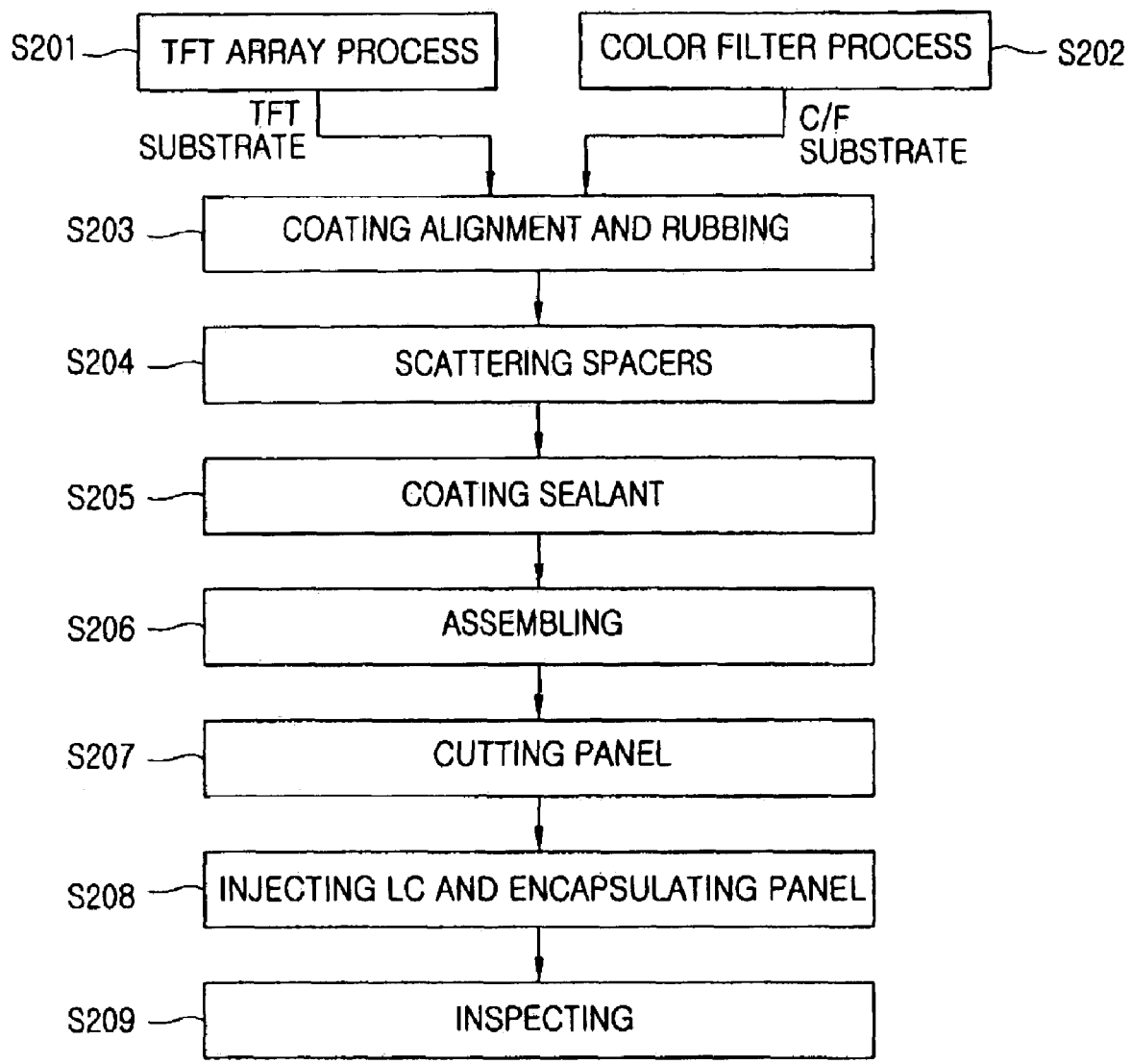
FIG. 5 is flow chart of an exemplary method of fabricating an LCD device according to the present invention.

FIG. 5 is flow chart of an exemplary method of fabricating an LCD device according to the present invention. In FIG. 5, a Step S201 may include forming a plurality of TFTs on a TFT substrate.

In a Step S202, a color filter layer may be formed on a C/F substrate. In addition, an alignment layer may be deposited a C/F substrate.

In a Step S203, alignment layers may be formed on the TFT substrate and the C/F. Then, both the alignment layers may be rubbed to provide an aligning controlling force.

In a Step S204, spacers may be scattered on the TFT substrate.

In a Step S205, a sealant material may be coated on the C/F substrate, wherein the sealant material may include a liquid crystal injection hole.

In a Step S206, the TFT substrate and the C/F substrate may be bonded together to form an LCD panel having a plurality of unit display cells.

In a Step S207, the LCD panel may be cut into individual display cells.

In a Step S208, liquid crystal material may be injected into the display cells through the liquid crystal injection hole, and the liquid crystal injection hole may be sealed by encapsulating the display cell.

In a Step S209, the display cells may be inspected.

Figure 6A:
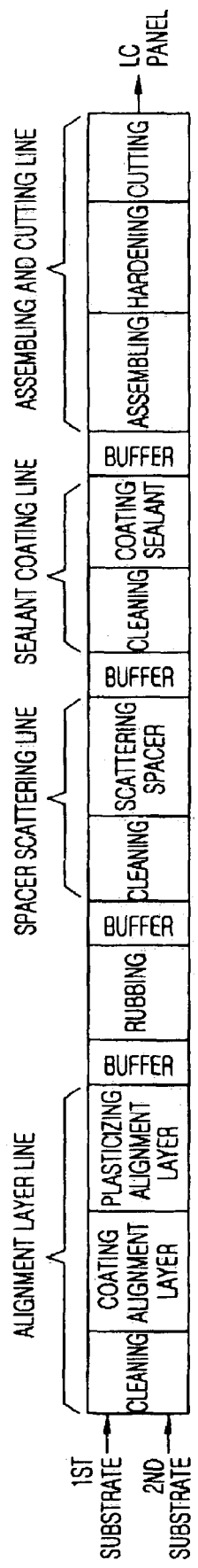
FIGS. 6A and 6B are schematic flow charts of an exemplary fabrication system for fabricating an LCD device according to the present invention.
Figure 6B:
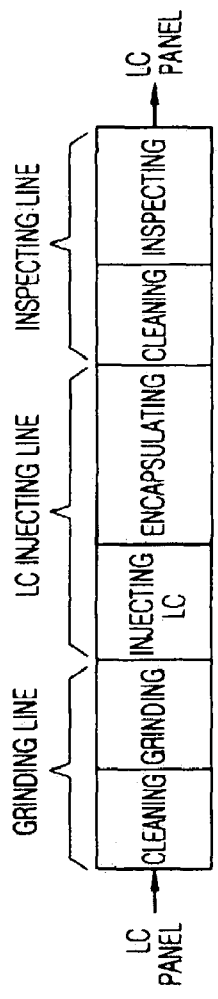

FIGS. 6A and 6B are schematic flow charts of an exemplary fabrication system for fabricating an LCD device according to the present invention. In FIGS. 6A and 6B, a fabrication system for fabricating an LCD device may include two unified fabrication lines, wherein FIG. 6A shows a first line for processing glass plates before cutting and FIG. 6B shows a second line for processing the cut unit panel.

In FIG. 6A, the first line may include an alignment layer line, a rubbing line, a spacer scattering line, a sealant coating line, and an assembling and cutting line. The alignment layer line, the rubbing line, and the assembling and cutting line may be process lines for processing a TFT substrate and a C/F substrate. In addition, the spacer scattering line may be a process line for processing the TFT substrate, and the sealant coating line may be a process line for processing the C/F substrate.

The TFT substrate and the C/F substrate, which are respectively processed in the TFT line and the C/F line, may be alternatively supplied to the alignment layer line. Although any one of the TFT substrate and the C/F substrate may be supplied first, for purposes of explanation, supplying the TFT substrate first will be described.

The TFT substrate is supplied to the alignment layer line of the first line, wherein the TFT substrate is cleaned during a cleaning process, an alignment layer material is coated onto the cleaned TFT substrate, and then heated to plasticize the alignment layer material. Then, while the TFT substrate is supplied to a buffer line, the C/F substrate is simultaneously supplied to the cleaning process of the alignment layer line. The buffer line may synchronize movement of the TFT substrate and the C/F substrate. Accordingly, the different processes are performed so that the TFT substrate and the C/F substrate have different processing ending time. In addition, since the processing interval in two adjacent processes (i.e., lines) may be different, the TFT substrate and the C/F substrate may interfere with each other by the interval difference. Accordingly, by maintaining the TFT substrate in the buffer and allowing the C/F substrate to finish the alignment layer line, processing of the TFT substrate and the C/F substrate may be synchronized.

For example, when the TFT substrate has completed the alignment layer line, the TFT substrate may be supplied to a rubbing line and at the same time the C/F substrate may be supplied to the cleaning process of the alignment layer line. Accordingly, there exists a time difference between processing times of the rubbing line and the alignment layer line so that when the C/F substrate completes the alignment layer line, it is maintained in the buffer line for a certain time.

Next, an alignment direction of the alignment layer of the TFT substrate is determined after the rubbing process, and the TFT substrate may be supplied to a spacer scattering line. Simultaneously, the C/F substrate may be transferred from the buffer and supplied to the rubbing line to determine the alignment direction of the alignment layer of the C/F substrate.

Then, after the rubbing process, the TFT substrate and the C/F substrate respectively may proceed to different processes. For example, the TFT substrate may be supplied to the spacer scattering line and the C/F substrate may be supplied to a sealant coating line without being supplied to the spacer scattering line. Accordingly, the TFT substrate may proceed through the rubbing line and may be supplied to the space scattering line to disperse the spacers without the TFT substrate being supplied to a sealant coating line. In addition, the C/F substrate may be maintained in a buffer arranged at an end of the rubbing line while the spacer scattering process is performed on the TFT substrate. Then, the TFT substrate may be maintained in a buffer at an end of the sealant coating line after the spacer scattering process is completed, and the C/F substrate may be supplied to the sealant coating line to coat the sealant material along an edge area of the C/F substrate.

Alternatively, an order of the spacer scattering line and the sealant coating line may be changed. If the TFT substrate is supplied to the alignment layer line first, then the TFT substrate may complete the rubbing process and may pass the sealant coating line without any process to be supplied to the spacer scattering line. Similarly, the C/F substrate may complete the rubbing process and may be supplied to the sealant coating line, wherein the sealant coating process may be performed on the C/F substrate while the TFT substrate may continue through the spacer scattering process. In other word, when the sealant coating line is arranged prior to the spacer scattering line, since the spacer scattering process of the TFT substrate and the sealant coating process of the C/F substrate may be simultaneously proceeded for a certain time, it may be possible to perform a rapid fabrication process.

Next, the TFT substrate may complete the spacer scattering line and the C/F substrate may complete the sealant coating line, wherein the TFT substrate and the C/F substrate may be supplied to an assembling and cutting line to be bonded together. Then, the bonded TFT and C/F substrates may be cut into individual liquid crystal display cells. Next, the individual liquid crystal display cells may be supplied to the second line, as shown in FIG. 6B.

According to the present invention, the first line may include processing stages having the alignment layer line, the rubbing line, the spacer scattering line, the sealant coating line, and the assembling and cutting line. In addition, the buffer line may be disposed between adjacent processing stages to synchronize the TFT substrate and the C/F substrate to fabricate the individual liquid crystal display cells. In FIG. 6A, each processing stage may be arranged along the proceeding direction of the TFT and C/F substrates. However, the TFT and C/F substrates may be proceeded by a substrate moving system (i.e., conveyer), wherein each of the rubbing line, the spacer scattering line, the sealant coating line, and the assembling and cutting line may be installed near the substrate moving system. Accordingly, the TFT and C/F substrates may be supplied between the processing stages by the substrate moving system such that when the TFT or C/F substrate has completed a process, it is moved to a next processing stage by the substrate moving system.

In FIG. 6B, the second line may include a grinding line, a liquid crystal material injecting line, and an inspecting line. The liquid crystal display cell may be processed by the assembling and cutting line of the first line, in FIG. 6A, and may be supplied to the grinding line of the second line. Accordingly, the liquid crystal display cell may be ground in the grinding line and the liquid crystal material may be injected into the liquid crystal display cell through a liquid crystal injection hole in the liquid crystal injecting line, wherein the liquid crystal injection hole may be encapsulated to form the liquid crystal material layer. Then, the liquid crystal display cell may be inspected.

According to the present invention, the TFT substrate and the C/F substrate may be supplied to the first and second fabrication lines to fabricate an LCD cell. Thus, a total number of individual fabrication lines may be reduced and fabrication costs may be reduced. For example, in the present invention, the alignment layer may be formed onto the TFT substrate and the C/F substrate by using one alignment line. Accordingly, fabrication costs may be reduced and fabrication space may be minimized. Thus, overall fabrication costs of the LCD device may be reduced.

In addition, preparation of the expensive automatic transferring device for transferring the substrate or the liquid crystal display panel may not be necessary, wherein the fabrication costs of the LCD device may be further reduced and a fabrication time may be significantly reduced.

Moreover, the fabrication system according to the present invention may not be limited to the structure of the LCD device. For example, various types of LCD devices, such as in-plane switching (IPS) mode LCD devices, reflective LCD devices, and semi-transparent LCD devices, may be fabricated in accordance with the present invention.

Furthermore, the present invention may not be limited to the fabrication system and method of fabrication discussed above. For example, methods of fabricating the LCD device may include directly dispensing liquid crystal material onto one or both of the TFT and C/F substrates instead of injecting the liquid crystal material between the bonded TFT and C/F substrates. Accordingly, the present invention may be applied to the liquid crystal dispensing method. In the liquid crystal dispensing method, the liquid crystal material is dropped onto one of the TFT substrate or C/F substrate using a liquid crystal dispenser, and the dropped liquid crystal is uniformly spread out over an entire area between the TFT and C/F substrates by applying pressure to the bonded TFT and C/F substrates. Accordingly, it may be possible to rapidly form the liquid crystal layer and to reduce fabrication time of the LCD device.

Figure 7:
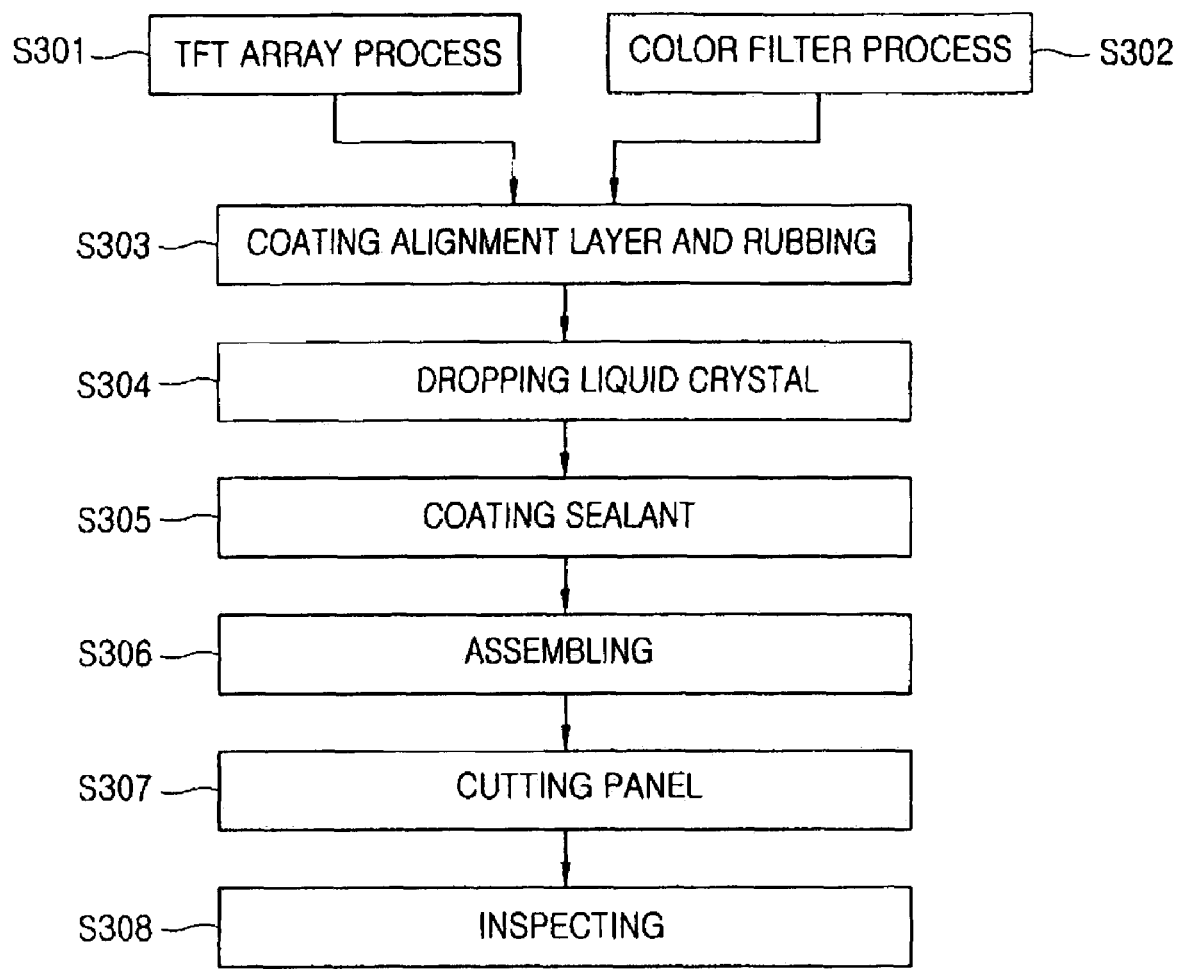
FIG. 7 is a flow chart of another exemplary method of fabricating an LCD device according to the present invention.

FIG. 7 is a flow chart of another exemplary method of fabricating an LCD device according to the present invention. In FIG. 7, a Step S301 may include forming a plurality of TFTs on a TFT substrate, and may include forming a plurality of spacers on the TFT substrate.

In a Step S302, a color filter layer may be formed on a C/F substrate, and a plurality of spacers may be formed on the C/F substrate.

In a Step S303, alignment layers may be formed on the TFT substrate and the C/F. Then, the alignment layers may be rubbed to provide an aligning controlling force.

In a Step S304, liquid crystal material may be dispensed onto one of the TFT substrate and the C/F substrate.

In a Step S305, a sealant material may be coated on one of the TFT substrate and the C/F substrate, wherein the sealant material may include a liquid crystal injection hole.

In a Step S306, the TFT substrate and the C/F substrate may be bonded together to form an LCD panel having a plurality of unit display cells.

In a Step S307, the LCD panel may be cut into individual display cells.

In a Step S308, the individual display cells may be inspected.

According to the present invention, a liquid crystal dispensing process may be included and a plurality of spacers may be formed on one or both of the TFT substrate and the C/F substrate. Thus, the LCD device may have a reduced number of fabrication process steps, thereby reducing fabrication costs and reducing fabrication time.

Figure 8:
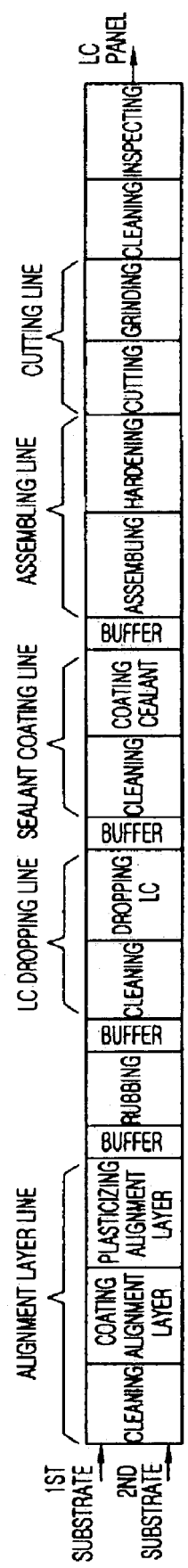
FIG. 8 is a schematic flow chart of another fabrication system for fabricating an LCD device according to the present invention.

FIG. 8 is a schematic flow chart of another fabrication system for fabricating an LCD device according to the present invention. The exemplary fabrication system of FIG. 8 may be similar to the exemplary fabrication system of FIGS. 6A and 6B, except the first and second lines of FIGS. 6A and 6B may be incorporated into one single process line. In addition, a liquid crystal dropping line has been included and the liquid crystal injecting line has not been included, and the spacer scattering line of FIG. 6A may not be included in the exemplary fabrication system of FIG. 8. Moreover, the assembling and cutting line of FIG. 6A has been broken down into separate processing stages, i.e., an assembling line and a cutting line.

In FIG. 8, the alignment layer line, the TFT and C/F substrates, which respectively pass through the TFT and C/F lines, may be alternatively supplied to form the alignment layer. Then the TFT and C/F substrates may be respectively supplied to the rubbing line to provide the aligning controlling force. Accordingly, the buffer line may be disposed between the processing stages to prevent interference between the TFT and C/F substrates by synchronizing movement of the TFT substrates and the C/F substrates.

The TFT substrate (or C/F substrate) may include an alignment layer having an alignment direction supplied to the liquid crystal dispensing line, and the C/F substrate (or TFT substrate) may be supplied to the sealant coating line. Then, the TFT substrate and the C/F substrate may be supplied to the assembling to be bonded together by application of pressure. Accordingly, the liquid crystal material dropped onto the TFT substrate (or C/F substrate) may be uniformly spread over an entire area between the TFT and C/F substrates by the applied pressure. Then, the bonded TFT and C/F substrates may be cut into individual liquid crystal display cells and then inspected.

It will be apparent to those skilled in the art that various modifications and variations can be made in the fabrication system for a liquid crystal display device and method of fabricating a liquid crystal display device using the fabrication system of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
   supplying a first substrate and a second substrate separately into a single fabrication system;
   forming an alignment layer on the first and second substrates separately in a first unit;
   dispensing liquid crystal material onto one of the first substrate and the second substrate in a second unit;
   coating a sealant material on one of the first substrate and the second substrate in a third unit;
   maintaining one of the first and second substrates between the neighboring units of the first unit, the second unit, the third unit, a fourth unit, and a fifth unit using buffer lines disposed between each neighboring units while the other of the first and second substrates is processed in the corresponding units in order to synchronize the first and second substrates;
   bonding the first and second substrates together in the fourth unit; and
   separating the bonded first and second substrates into a plurality of liquid crystal display cells in the fifth unit, the first, second, third, fourth and fifth units being physically connected along a single fabrication line of the fabrication system.

2. The method according to claim 1, further comprising:
   forming a plurality of thin film transistors on the first substrate; and forming a color filter layer on the second substrate.

3. The method according to claim 1, further comprising:
forming patterned spacers on the first substrate before supply the first substrate to the unified fabrication system.

4. The method according to claim 3, wherein first unit includes an alignment line, the second unit includes a liquid crystal line, the third unit includes a sealant coating line, the fourth unit includes a assembling line, and the fifth unit includes a cutting line.

5. The method according to claim 3, wherein each buffer line is fixed between the neighboring units so that the buffer line maintains only the first and second substrates between the neighboring units.

6. The method according to claim 3, wherein the maintain of the first and second substrates between the neighboring two units is independent upon the maintain of the first and second substrates between other neighboring two units.

7. The method according to claim 1, wherein the forming an alignment layer includes:
coating an alignment layer material on the first and second substrates separately;
plasticizing the coated alignment layer material; and
providing an aligning controlling force to the plasticized alignment layer material.

8. The method according to claim 1, further comprising inspecting the liquid crystal display cells.

\* \* \* \* \*